(12) United States Patent
Saito et al.

(10) Patent No.: US 6,730,342 B2
(45) Date of Patent: May 4, 2004

(54) POWERED COMPOSITION FOR FOOD AND DRINK

(75) Inventors: Makoto Saito, Noda (JP); Emiko Yamazaki, Noda (JP); Akio Obata, Noda (JP)

(73) Assignee: Kikkoman Corporation, Chiba (JP)

( * ) Notice: Subject to any disclaimer, the term of this patent is extended or adjusted under 35 U.S.C. 154(b) by 299 days.

(21) Appl. No.: 10/026,689

(22) Filed: Dec. 27, 2001

(65) Prior Publication Data

US 2003/0138531 A1 Jul. 24, 2003

(51) Int. Cl.$^7$ .................................. A23L 1/212
(52) U.S. Cl. .................. 426/250; 426/590; 426/599; 426/656
(58) Field of Search .................. 426/250, 74, 690, 426/599, 656

(56) References Cited

U.S. PATENT DOCUMENTS

| | | | |
|---|---|---|---|
| 6,436,446 B1 | * | 8/2002 | Forusz et al. ............... 424/682 |
| 6,440,449 B1 | * | 8/2002 | Hirschberg ................. 424/439 |
| 2003/0104108 A1 | * | 6/2003 | Patel et al. ................. 426/589 |

OTHER PUBLICATIONS

"Anthocyanins Contained in Blueberry—Contribution to Improvement in Visual Function," Report of $2^{nd}$ Blueberry Function Symposium, 1998. (with English translation).

* cited by examiner

*Primary Examiner*—N. Bhat
(74) *Attorney, Agent, or Firm*—Young & Thompson

(57) ABSTRACT

A powdered composition for food and drink comprising powdered soy protein isolate, anthocyanin and an organic acid composition is provided which is dissolved or suspended in water, milk, to provide a beverage which has a vivid reddish purple color characteristic of anthocyanin and which the anthocyanin is stabilized to maintain its various functions.

5 Claims, No Drawings

POWERED COMPOSITION FOR FOOD AND DRINK

BACKGROUND OF THE INVENTION

The present invention relates to a powdered composition for food and drink which comprises powdered soy protein isolate, an anthocyanin-containing powder, and an organic acid. More particularly, it relates to a powdered composition for food and drink which is dissolved or suspended in water, milk, etc. to stably provide a drink with a bright color developed by an anthocyanin pigment present in the anthocyanin-containing powder.

Although powdered soy protein isolate is widely used for food and drink for health maintenance, it is hard to take as such because of its peculiar beany flavor. Therefore, compositions containing soy protein isolate together with fruit components such as fruit juice or comminuted fruit for making the composition easy to take have been manufactured and commercially sold. Fruits used in combination with soy protein isolate are usually selected from those are rich in nutriment, such as vitamins, and contain a relatively vivid color juice.

Such fruits include blueberries and cranberries. They not only contain nutriment such as various vitamins but assume an appetizing bright reddish purple color. Of the pigments contained in these fruits, anthocyanins, which are glycosides of anthocyanidins, have now been turned out to possess various physiological functions, such as a rhodopsin (visual purple) resynthesizing function, a capillary protecting function, an anti-ulcer function, a circulatory organ improving function, an anti-inflammatory function, and a vitamin P-like function as reported, e.g., in 2nd Blueberry Function Symposium, held by Japan Blueberry Association at Minami Aoyama Kaikan in Minato-ku, Tokyo on Apr. 24, 1998. Addition of powder of such fruit containing an anthocyanin to soy protein isolate provides a powdered composition for food and drink which has the functions of soy protein isolate supplemented by the above-mentioned various functions and is easy to take.

However, when a powdered composition containing soy protein isolate and an anthocyanin-containing powder (e.g., an anthocyanin-containing fruit powder) is dissolved or suspended in water, milk, a sports drink, etc., the bright reddish purple color characteristic of anthocyanin pigments hardly develops but results in pale gray. Where the powdered composition is supplemented with minerals such as calcium and magnesium by addition of dolomite, calcium carbonate, magnesium carbonate or coral minerals, on dissolving or suspending the powdered composition in a liquid, such as water, milk, or sports drink, the mineral components will dissolve in the liquid to show a strong alkaline property, which makes the color unpleasantly grayer.

Equal in nutrition, nevertheless, such poorly colored drinks cannot be seen as appetizing and are likely to look like deteriorated in quality, which reduces consumers' willingness to buy. As for an anthocyanin itself, which is a reddish purple pigment of the anthocyanin-containing powder, it sometimes decomposes with time to reduce the above-described various physiological functions. From this viewpoint, it has been desired to stabilize anthocyanins.

SUMMARY OF THE INVENTION

An object of the present invention is to provide a powdered composition for food and drink containing powdered soy protein isolate and an anthocyanin which develops a bright reddish purple color characteristic of an anthocyanin pigment when dissolved or suspended in water, milk, a sports drink, etc. for drinking, and in which the anthocyanin is stable with time to retain its various physiological functions.

The present inventors have conducted extensive studies to accomplish the object and found as a result that the above-described problems are settled by incorporating an organic acid, such as citric acid, into the composition of powdered soy protein isolate and an anthocyanin-containing powder. The present invention has been completed based on this finding.

The present invention provides a powdered composition for food and drink which comprises powdered soy protein isolate, an anthocyanin-containing powder, and an organic acid. While it is known that an anthocyanin itself satisfactorily develops a reddish purple color in an acidic condition, improvement on color development of an anthocyanin in the presence of powdered soy protein isolate is utterly unknown.

DETAILED DESCRIPTION OF THE PREFERRED EMBODIMENTS

The powdered soy protein isolate which can be used in the present invention is not particularly limited in process of preparation. Any product containing powdered protein isolated from soybeans in a conventional manner can be used. Useful powdered soy protein isolates include a product prepared by extracting defatted soybeans (residue after removing soybean oil from whole soybeans) with water to remove saccharides, etc., separating protein with an acid, neutralizing the isolated protein, followed by sterilization and drying; a textured soy protein product prepared by extruding soy protein isolate followed by drying and granulating; and a soy peptide product prepared by enzymatically or chemically degrading a part or the whole of soy protein isolate followed by sterilizing and drying. Commercially available powdered soy protein isolates which can be used in the present invention include SUPRO 710, Fujipro, Proleena, Fujinix, Apex, and Hinute (all available from Fuji Protein Technologies Inc.).

The anthocyanin-containing powder which can be used in the present invention is not particularly limited as long as it contains an anthocyanin, including powdered products obtained from plant parts containing an anthocyanin, such as fruit, fruit juice, petals and leaves, by usual means such as lyophilization or hot air drying, and purified products obtained by extracting these plant parts. Preferred examples of anthocyanin-containing powders are powder prepared by drying juice or extract of cranberries having a urinary infection prophylactic function and powdered blueberry juice. Such anthocyanin-containing powder products are commercially available under trade names of Cranberry Powder (available from Kikkoman Corp.) and Blueberry Powder (available from Nihon SiberHegner K. K.). In addition, Hibiscus Funmatsu (powdered hibiscus petals, available from Biocon (Japan) Ltd.), Shiso-no-ha Funmatsu (powdered perilla leaves, available from Amino Up Chemical Co., Ltd.) and Murasaki-imo Powder (powdered purple sweet potato (*Ipomoea batatas* Poir), available from Senba Foods Co., Ltd.) are also useful.

The organic acid which can be used in the present invention preferably includes those which are usually crystalline or powdery, such as citric acid, tartaric acid, and malic acid, seeing that the composition of the invention has a powder form. Organic acids which are usually liquid may be made usable by, for example, granulating as a cyclodextrin inclusion compound. Of the useful organic acids citric acid, tartaric acid and malic acid are particularly preferred for their flavor when incorporated into the powdered composition as demonstrated later. Mineral acids, such as hydrochloric acid and sulfuric acid are also capable of letting anthocyanin pigments develop their bright reddish purple colors when the powdered composition is dissolved or suspended. However, they give an unacceptably irritating taste and is unfit for application to the powdered composition for food and drink.

The mixing ratio of the powdered soy protein isolate, the anthocyanin-containing powder, and the organic acid is not particularly limited. It is arbitrarily selected according to the intended use of the powdered composition and the desired degree of color development by the anthocyanin on dissolving or suspending. Seeing that, in general, compositions of this type comprise powdered soy protein isolate as a main component and anthocyanin-containing powder as a supplementary component for making the composition easy to take, the formulation of the powdered composition of the present invention usually comprises about 50 to 95% by weight of powdered soy protein isolate, about 4 to 49% by weight of an anthocyanin-containing powder, and about 2 to 20% by weight of an organic acid each based on the total powdered composition. Higher contents of the anthocyanin-containing powder and the organic acid generally result in development of a denser color on dissolving or suspending the powdered composition in water and the like.

In order for the powdered composition to provide a palatable liquid with an appropriate color tone, the organic acid content in the powdered composition preferably ranges from 2.0 to 20.0% by weight. For example, where 10 g of powdered soy protein isolate and 2 g of an anthocyanin-containing powder are mixed, a preferred amount of an organic acid added is about 0.25 to 3.0 g. In this case, the resulting powdered composition consists of 66.7 to 81.6% by weight of soy protein isolate, 13.3 to 16.3% by weight of the anthocyanin-containing powder, and 2.0 to 20.0% by weight of the organic acid.

The powdered composition of the present invention is dissolved or suspended in a liquid, such as water, milk, and a sports drink containing phosphates, minerals, vitamins, etc., to provide a palatable drink with a pleasant color. In particular, incorporation of the organic acid is extremely effective on color development where the powdered composition further comprises mineral components showing strong alkalinity, such as dolomite, calcium carbonate, magnesium carbonate and coral minerals for mineral supplement, because anthocyanin pigments hardly develop their characteristic colors when dissolved or suspended in the presence of such an alkaline substance. An adequate intake of the powdered composition for food and drink according to the present invention as a health maintenance food is generally about 10 to 50 g in terms of soy protein isolate per day for an adult, while somewhat varying depending on the formulation.

Since the color development of the powdered composition of the invention is attributed to organic acid-aided development of a color of a naturally-occurring pigment but not to artificial colorants as has been usual with this type of food and beverages, the powdered composition is highly safe. Further, the anthocyanin glycoside itself can be stabilized by rendering the powdered composition acidic, thereby keeping the above-described physiological activities during storage. Therefore, the powdered composition of the present invention is extremely beneficial as a health maintenance food.

The present invention will now be illustrated in greater detail with reference to Test Examples and Examples, but it should be understood that the invention is not deemed to be limited thereto. The anthocyanin-containing powders used in Test Examples and Examples are Blueberry Powder, sold by Nihon SiberHegner K. K., which is a freeze-dried powder of fresh blueberry juice; Cranberry Powder, available from Kikkoman Corp., which is a powdered cranberry juice; and Hibiscus Funmatsu, available from Biocon (Japan) Ltd., which is hibiscus powder. The powdered soy protein isolate used is SUPRO 710 sold by Fuji Protein Technologies Inc.

TEST EXAMPLE 1

Organoleptic Evaluation of Organic Acid

Organic acids suited for use in the present invention were investigated. Ten grams of powdered soy protein isolate and 2 g of powdered cranberry juice were dissolved and suspended in water to make 50 ml, and hydrochloric acid, sulfuric acid, citric acid, tartaric acid, lactic acid, phosphoric acid or malic acid was added thereto to adjust to pH 3.5. The palatability of the resulting mixture was organoleptically evaluated by a panel of 5 testers and graded+(sufficiently acceptable as food), ±(generally acceptable) or–(unacceptable). The results are shown in Table 1.

TABLE 1

| Sample No. | Base Mixture | Acid | Results of Evaluation | | | | |
|---|---|---|---|---|---|---|---|
| 1 | soy protein + cranberry | hydrochloric acid | – | – | – | – | – |
| 2 | soy protein + cranberry | sulfuric acid | – | – | – | – | – |
| 3 | soy protein + cranberry | citric acid | + | + | + | + | + |
| 4 | soy protein + cranberry | tartaric acid | + | ± | ± | + | + |
| 5 | soy protein + cranberry | lactic acid | + | ± | ± | ± | ± |
| 6 | soy protein + cranberry | phosphoric acid | + | ± | ± | – | – |
| 7 | soy protein + cranberry | malic acid | + | + | + | + | + |

Note: "soy protein + cranberry" in Table 1 is a liquid prepared by dissolving and suspending 10 g of powdered soy protein isolate and 2 g of cranberry powder in water to make 50 ml.

Observed with the naked eye, the samples 1 to 7 assumed a pleasant color attributed to the anthocyanin of cranberries with no substantial difference among them. As for palatability, however, samples containing hydrochloric acid and sulfuric acid had a pungent acid taste graded low and unacceptable as commercial goods. On the other hand, samples containing citric acid, tartaric acid, lactic acid and malic acid, which are organic acids, were palatable to the taste. Citric acid was graded the highest, and malic acid and tartaric acid followed.

TEST EXAMPLE 2

Evaluation of Color by Powdered Blueberry Juice

The relationship between color and amount of citric acid, being evaluated the most highly in palatability test in Test Example 1, was examined as follows. To a mixture of 10 g powdered soy protein isolate and 2.0 g of blueberry powder was added 0 g, 0.25 g, 0.5 g, 1.0 g, 1.5 g, 2.0 g, 2.5 g or 3.0 g of citric acid. The mixed powder was dissolved and suspended in 40 ml of water. A panel of 15 members observed the resulting liquids with their naked eye and gave them scores according to how close to blueberries' their color was based on the following standard, taking sample 1 containing no citric acid as a control. The average of the scores given by 15 panel members is shown in Table 2 below together with the pH of the liquid tested.

Standard of evaluation
+3 . . . Very pleasant
+2 . . . Pleasant
+1 . . . Slightly pleasant
 0 . . . Not different from the control

TABLE 2

| Sample No. | Composition | wt % of Organic Acid | pH | Score |
|---|---|---|---|---|
| 1 | soy protein + blueberry + citric acid (0 g) | 0 | 6.69 | 0 |
| 2 | soy protein + blueberry + citric acid (0.25 g) | 2.0 | 5.42 | 0.967* |
| 3 | soy protein + blueberry + citric acid (0.5 g) | 4.0 | 4.94 | 1.267* |
| 4 | soy protein + blueberry + citric acid (1.0 g) | 7.7 | 4.33 | 1.933* |
| 5 | soy protein + blueberry + citric acid (1.5 g) | 11.1 | 3.93 | 2.800* |
| 6 | soy protein + blueberry + citric acid (2.0 g) | 14.3 | 3.68 | 2.933* |
| 7 | soy protein + blueberry + citric acid (2.5 g) | 17.2 | 3.50 | 2.967* |
| 8 | soy protein + blueberry + citric acid (3.0 g) | 20.0 | 3.30 | 3.000* |

Note:
1) "soy protein + blueberry" is a mixture of 10 g of powdered soy protein isolate and 2 g of buleberry powder.
2) "wt % of Organic Acid" is a weight percentage of organic acid in the total powdered composition.
3) The asterisk mark * means P < 0.01 (n = 15).

As shown in Table 2, samples containing citric acid significantly differ from sample 1 (control), manifesting the pleasing color of blueberries more clearly with an increasing amount of citric acid added. It has been confirmed that addition of 2% or more of citric acid brings about development of a pleasant color. Addition of 20% or more of citric acid, while effective on color development, was proved to result in overpowering acid taste.

TEST EXAMPLE 3
Evaluation of Color of Powdered Cranberry Juice

The relationship between color and amount of organic acid (citric acid) was examined on compositions containing powdered cranberry juice as an anthocyanin-containing powder in the same manner as in Test Example 2, except that 0 g, 0.25 g, 0.5 g, 1.0 g, 1.5 g 2.0 g or 2.5 g of citric acid was added to a mixture of 10 g of powdered soy protein isolate and 2.0 g of cranberry powder, and the resulting mixed powder was dissolved and suspended in 75 ml of water. The results of evaluation and the pH of the solution or suspension are shown in Table 3.

TABLE 3

| Sample No. | Composition | wt % of Organic Acid | pH | Score |
|---|---|---|---|---|
| 1 | soy protein + cranberry + citric acid (0 g) | 0 | 5.45 | 0 |
| 2 | soy protein + cranberry + citric acid (0.25 g) | 2.0 | 4.86 | 0.933* |
| 3 | soy protein + cranberry + citric acid (0.5 g) | 4.0 | 4.55 | 1.333* |
| 4 | soy protein + cranberry + citric acid (1.0 g) | 7.7 | 4.16 | 1.933* |
| 5 | soy protein + cranberry + citric acid (1.5 g) | 11.1 | 3.86 | 2.733* |
| 6 | soy protein + cranberry + citric acid (2.0 g) | 14.3 | 3.63 | 2.933* |
| 7 | soy protein + cranberry + citric acid (2.5 g) | 17.2 | 3.50 | 2.967* |

Note:
1) "soy protein + cranberry" is a mixture of 10 g of powdered soy protein isolate and 2 g of cranberry powder.
2) "wt % of Organic Acid" is a weight percentage of organic acid in the total powdered composition.
3) The asterisk mark * means P < 0.01 (n = 15).

As shown in Table 3, samples containing citric acid significantly differ from sample 1 (control), manifesting the pleasing color of cranberries more clearly with an increasing amount of citric acid added. It has been confirmed that addition of 2% or more of citric acid brings about development of a pleasant color. Addition of 20% or more of citric acid, while effective on color development, was proved to result in overpowering acid taste.

TEST EXAMPLE 4
Evaluation of Color of Powdered Hibiscus Petals

The relationship between color and amount of organic acid (citric acid) was examined on compositions containing powdered hibiscus petals as an anthocyanin-containing powder in the same manner as in Test Example 2, except that 0 g, 0.25 g, 0.5 g, 1.0 g, 1.5 g, 2.0 g or 2.5 g of citric acid was added to a mixture of 10 g of powdered soy protein isolate and 2.0 g of hibiscus powder, and the resulting mixed powder was dissolved and suspended in 75 ml of water. The results of evaluation and the pH of the solution or suspension are shown in Table 4.

TABLE 4

| Sample No. | Composition | wt % of Organic Acid | pH | Score |
|---|---|---|---|---|
| 1 | soy protein + hibiscus + citric acid (0 g) | 0 | 5.10 | 0 |
| 2 | soy protein + hibiscus + citric acid (0.25 g) | 2.0 | 4.63 | 0.933* |
| 3 | soy protein + hibiscus + citric acid (0.5 g) | 4.0 | 4.30 | 1.800* |
| 4 | soy protein + hibiscus + citric acid (1.0 g) | 7.7 | 3.93 | 2.467* |
| 5 | soy protein + hibiscus + citric acid (1.5 g) | 11.1 | 3.69 | 2.800* |
| 6 | soy protein + hibiscus + citric acid (2.0 g) | 14.3 | 3.49 | 2.933* |
| 7 | soy protein + hibiscus + citric acid (2.5 g) | 17.2 | 3.35 | 2.967* |

Note:
1) "soy protein + hibiscus" is a mixture of 10 g of powdered soy protein isolate and 2 g of hibiscus powder.
2) "wt % of Organic Acid" is a weight percentage of organic acid in the total powdered composition.
3) The asterisk mark * means P < 0.01 (n = 15).

As is apparent from the results in Table 4, samples containing citric acid significantly differ from sample 1 (control), manifesting the pleasing color of hibiscus petals more clearly with an increasing amount of citric acid added. It has been confirmed that addition of 2% or more of citric acid brings about development of a pleasant color. Addition of 20% or more of citric acid, while effective on color development, was proved to result in overpowering acid taste.

TEST EXAMPLE 5
Evaluation of Color in the Presence of Dolomite

The relationship between color and amount of organic acid (citric acid) was examined on powdered compositions containing dolomite in the same manner as in Test Example 2, except that 0 g, 0.25 g, 0.5 g, 1.0 g, 1.5 g, 2.0 g, 2.5 g or 3.0 g of citric acid was added to the mixture of 10 g of powdered soy protein isolate, 2.0 g of blueberry powder, and 1.0 g of dolomite, and the resulting mixed powder was dissolved and suspended in 75 ml of water. The results of evaluation and the pH of the solution or suspension are shown in Table 5.

TABLE 5

| Sample No. | Composition | wt % of Organic Acid | pH | Score |
|---|---|---|---|---|
| 1 | soy protein + blueberry + dolomite + citric acid (0 g) | 0 | 6.85 | 0 |
| 2 | soy protein + blueberry + dolomite + citric acid (0.25 g) | 1.9 | 5.70 | 0.833* |
| 3 | soy protein + blueberry + dolomite + citric acid (0.5 g) | 3.7 | 5.10 | 0.933* |
| 4 | soy protein + blueberry + dolomite + citric acid (1.0 g) | 7.1 | 4.49 | 1.733* |
| 5 | soy protein + blueberry + dolomite + citric acid (1.5 g) | 10.3 | 4.13 | 2.400* |
| 6 | soy protein + blueberry + dolomite + citric acid (2.0 g) | 13.3 | 3.91 | 2.733* |
| 7 | soy protein + blueberry + dolomite + citric acid (2.5 g) | 16.1 | 3.71 | 2.800* |
| 8 | soy protein + blueberry + dolomite + citric acid (3.0 g) | 18.8 | 3.60 | 3.000* |

Note:
1) "soy protein + blueberry + dolomite" is a mixture of 10 g of powdered soy protein isolate, 2 g of buleberry powder and 1 g of dolomite.
2) "wt % of Organic Acid" is a weight percentage of organic acid in the total powdered composition.
3) The asterisk mark * means $P < 0.01$ (n = 15).

Addition of 2% or more of citric acid suffices for obtaining the pleasant color of blueberries where no dolomite is present as demonstrated in Test Example 2. In the presence of alkaline dolomite which increases the pH of the powdered composition when dissolved and suspended in water, an increased amount of citric acid is required. The results of Table 5 show that addition of about 4% or more of citric acid is desirable. Because of the pH shift to the alkaline side due to the presence of dolomite, addition of 3 g of citric acid (18.8% based on the total powdered composition) did not make the taste too sour and secured satisfactory taste and color. As is seen from Table 5, samples containing citric acid in any concentration exhibited significant difference from the sample containing no organic acid in the presence of alkaline dolomite, too.

EXAMPLE 1
Preparation of Cranberry Flavored Powdered Composition for Food and Drink A cranberry flavored powdered composition for food and drink weighing 200 kg was prepared according to the following formulation (unit: kg).

| | |
|---|---|
| SUPRO 710 | 156.893 |
| Cranberry Powder | 28.452 |
| Citric acid | 14.226 |
| Vitamin $B_1$ | 0.006 |
| Vitamin $B_2$ | 0.008 |
| Vitamin $B_6$ | 0.019 |
| Vitamin $B_{12}$ | 0.036 |
| Vitamin C | 0.360 |

EXAMPLE 2
Preparation of Cranberry Flavored, Dolomite-containing Powdered Composition for Food and Drink A cranberry flavored, dolomite-containing powdered composition for food and drink weighing 200 kg was prepared according to the following formulation (unit: kg).

| | |
|---|---|
| SUPRO 710 | 142.667 |
| Dolomite | 14.226 |
| Cranberry Powder | 28.452 |
| Citric acid | 14.226 |
| Vitamin $B_1$ | 0.006 |
| Vitamin $B_2$ | 0.008 |
| Vitamin $B_6$ | 0.019 |
| Vitamin $B_{12}$ | 0.036 |
| Vitamin C | 0.360 |

The powdered composition for food and drink according to the present invention, which comprises soy protein isolate, an anthocyanin-containing powder, and an organic acid, develops a bright reddish purple color of an anthocyanin pigment when dissolved or dispersed in water, milk, a sports drink, and the like. Compared with a powdered composition containing no organic acid which does not develop such a pleasing color but a gray when dissolved or suspended, failing to provide a drink with an appetizing color, the powdered composition of the present invention definitely develops the anthocyanin color to provide a drink with an appetizing color even where the powdered composition contains alkaline mineral components such as dolomite as a mineral supplement. Besides, the anthocyanin itself is stabilized by the organic acid added and thereby maintains its various physiological functions during storage. Thus, the powdered composition of the invention possesses the functions of both soy protein and an anthocyanin and is of extremely high utility as food and drink for health maintenance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A powdered composition for food and drink which comprises powdered soy protein isolate, an anthocyanin-containing powder, and an organic acid.

2. The powdered composition for food and drink according to claim 1, wherein said anthocyanin-containing powder is powdered cranberry juice or powdered blueberry juice.

3. The powdered composition for food and drink according to claim 1, wherein said organic acid is citric acid, tartaric acid or malic acid.

4. The powdered composition for food and drink according to claim 1, wherein said organic acid is present in an amount of 2 to 20% by weight based on the total composition.

5. The powdered composition for food and drink according to claim 1, which further comprises a mineral component.

* * * * *